Jan. 5, 1943.	G. KOEHLER	2,307,319
TESTING CIRCUIT
Filed Dec. 8, 1941
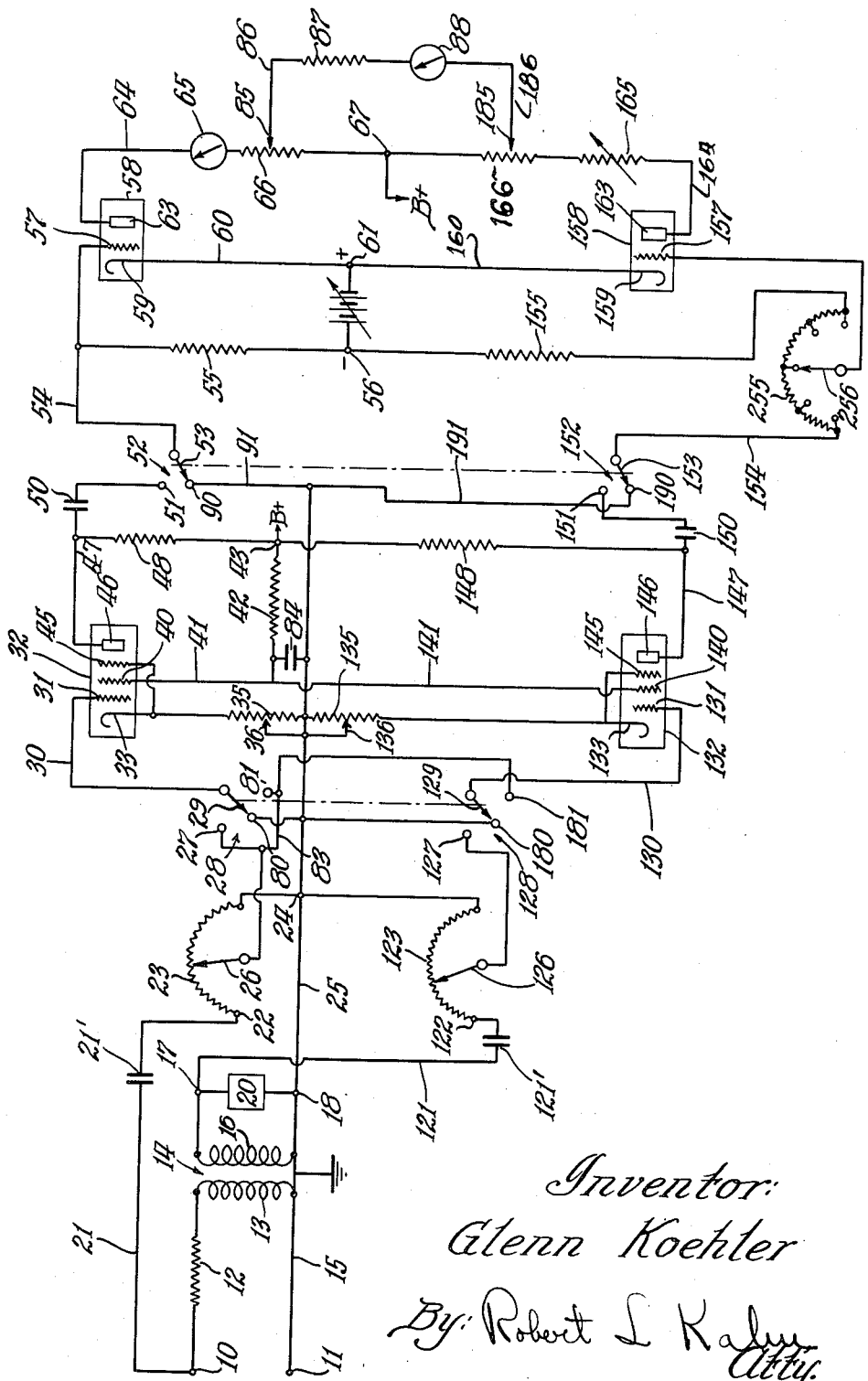
Inventor:
Glenn Koehler
By Robert L. Kahn
Atty.

Patented Jan. 5, 1943

2,307,319

UNITED STATES PATENT OFFICE 2,307,319

TESTING CIRCUIT

Glenn Koehler, Madison, Wis., assignor to Chicago Transformer Corporation, a corporation of Illinois Application December 8, 1941, Serial No. 422,067

2 Claims. (Cl. 175—183)

This invention relates to a testing circuit and particularly to a testing circuit for use with a device or means having a voltage input and output whose ratio over a band of frequencies is to be determined. In particular, the circuit is useful in connection with the determination of characteristics of transformers, amplifier stages, filter systems and the like. The circuit may advantageously be used in testing audio frequency transformers and amplifiers. When used in this manner, the significant test results may be logarithmically related to yield relative decibel values. It is thus possible to plot a curve showing decibel to frequency relationship. Other fields of use will occur to those skilled in the art.

Referring now to the drawing, the single figure shows the circuit.

Terminals 10 and 11 may be considered as the source of alternating currents at variable or predetermined frequencies. Thus an oscillator may supply terminals 10 and 11 with such alternating currents. The frequencies may have any values and ranges and as applied to testing audio frequency transformers may vary from about 30 cycles per second up to 10,000 or even higher.

In order to simulate true operating conditions for the device being tested, an artificial driver impedance 12 may be connected to terminal 10. Impedance 12 is then connected to the device tested, here primary 13 of an audio frequency transformer 14, and the input circuit is completed by wire 15 connecting primary 13 and terminal 11. In the case shown, impedance 12 may be the output circuit of some amplifier or other tube.

Transformer 14 has the secondary 16 supply output terminals 17 and 18. Output terminals 17 and 18 may have a terminating impedance 20 connected or not, as desired. At any rate terminals 11 and 18 are connected together. Terminal 10 is connected by wire 21 through a coupling condenser 21' to one end 22 of a resistance 23 whose terminal 24 is connected to a grounded wire 25 connected to terminal 11. Cooperating with resistance 23 and forming a potentiometer is a slider 26 connected to point 27 of a three position switch 28. Rotor or movable contact 29 of switch 28 is connected by wire 30 to control grid 31 of a vacuum tube amplifier 32. This amplifier may be of any suitable type and as disclosed herein is of the pentode variety for obtaining high voltage amplification. Thus tube 32 has its cathode 33 connected through a bias resistor 35 to wire 25. A bias control may be obtained by slider 36 connected to wire 25 and cutting out any desired portion of resistance 35. An accelerating grid 40 is connected by wire 41 to a resistor 42 whose terminal 43 is to be connected to a positive source of potential. Resistor 42 also functions to eliminate any tendency for oscillations through feed back in tube 32 (and later described tube 132) as well as between these two tubes. A suppressor grid 45 is connected back to the cathode while an anode 46 is connected by wire 47 to a load resistor 48 and thence to a terminal 43. It is understood that separate voltage connections for the various electrode connections may be provided if separate potential sources are to be used. However, the connections shown are common and convenient.

Anode 46 is also connected by wire 47 to one terminal of a blocking condenser 50, the other terminal of which is connected to a switch point 51 of a switch 52. Movable contact 53 cooperating with point 51 is itself connected by wire 54 to a bias resistor 55 having a terminal 56. Resistor 55 is also connected to control grid 57 of a vacuum tube detector 58. This tube has a cathode 59 connected by wire 60 to a terminal 61. Between terminal 61 and terminal 56, a variable bias means as a battery is disposed with terminal 61 positive to terminal 56. It is understood that a voltage drop due to the anode supply may be used for grid bias as is customary in modern radio receivers. Anode 63 is connected by wire 64 through a meter 65 and resistor 66 to terminal 67, adapted to be connected to the positive pole of a plate supply.

Going back to terminal 17, lead 121 is connected through coupling condenser 121' similar to condenser 21' to terminal 122 of a resistor 123 whose terminal 124 is connected to wire 25. Potentiometer contact 126 is connected to switch point 127 of a three position switch 128 similar to switch 28. Switch points 80 and 180 on the two switches are connected to wire 25. Switch points 81 and 181 on the two switches are connected together by wire 182 and are connected to switch point 27 by wire 83. Rotor 129 of switch 128 is preferably coupled to move with rotor 29 of switch 28 so that the switch contacts are established as indicated.

Rotor contact 129 is connected to control grid 131 of a vacuum tube amplifier 132, similar in characteristics to tube 32. Cathode 133, suppressor 145 and anode 146 are connected through the variously numbered elements in a manner analogous to the corresponding parts in tube 32. Accelerating grid 140 is connected by wire 141 to wire 41 and these two are connected to a bypass condenser 84 which is itself connected to wire 25. Blocking condenser 150 is connected between anode 146 and switch point 151. Movable contact 153 is mechanically connected to move with contact 53 and contact 153 is connected by wire 154 to a resistor 155 and thence to terminal 56. Resistor 155 may for convenience, have a portion 255 thereof subdivided into small calibrated sections, each of which may correspond to a definite decibel variation. Movable contact 256 cooperating with resistance portion 255 is connected to grid 157 of detector 158 having characteristics similar to detector 58. Cathode 159 is connected by wire 160 to terminal 61 while anode 163 is connected by wire 164 to a variable resistor 165 and thence through resistor 166 to terminal 67.

Sliders 85 and 185 cooperate with resistors 66 and 166 respectively and are connected by wires 86 and 186 to resistance 87 and meter 88 both in series with each other. Switch points 90 and 190 on the two position switches are grounded to wire 25 by wires 91 and 191.

With switches 52 and 152 in the position shown, the circuit may be balanced to compensate for lack of symmetry due to differences between tubes 58 and 158. In this position, control grids 57 and 157 are grounded to wire 25. Hence resistance 165 and sliders 85 and 185 may be adjusted to balance tubes 58 and 158 so that meter 88 does not show current flowing in either direction. Resistance 165 functions more or less as a balancing impedance for meter 65 as well as to balance the characteristics of tubes 58 and 158. Under some conditions, resistance 165 may even be disposed in the anode circuit of tube 58. In practice resistance 165 and slider 85 are the main controls for obtaining a balanced condition in meter 88. It is clear that meter 65 is merely an ordinary milliammeter while meter 88 should read both positive and negative current or potential values.

Assuming that meter 88 shows no current and meter 65 shows a proper space current for the tubes, switches 52 and 152 may now be moved to engage contacts 51 and 151. Control grids 31 and 131 are connected to contacts 81 and 181 and control grids 57 and 157 are connected to their respective blocking condensers. If meter 88 shows a reading, then the grid biases of tubes 32 and 132 may be adjusted by operating with slides 36 and 136 and resistance 165 and slider 185 are adjusted so that meter 88 reads no current or voltage over the complete range of input voltages to tubes 32 and 132. After this is done it may be advisable to go back to the first switch position: i. e. contacts 90 and 190 connected to rotors 53 and 153. This is merely to recheck the balance of tubes 58 and 158 and may be required merely because of coupling through common power supplies, etc., between the successive amplifier stages.

Assuming that the tubes have been properly balanced, switches 52 and 152 are retained in their working positions to connect contacts 51 and 53 as one pair and 151 and 153 as another pair. Switches 28 and 128 are now moved so that contacts 81 and 181 are connected to their respective rotors. At the same time terminals 10 and 11 have impressed thereon currents of predetermined frequency and potential. Hence input (with reference to transformer 14) voltages are impressed across resistance 23. A predetermined voltage ratio is taken by slider 26 and the same voltage impressed upon both control girds 31 and 131. It is clear that meter 88 will remain balanced in zero position while meter 65 will show a definite reading.

By the above procedure an artificial or arbitrary output level is taken as a norm and deviations therefrom may now be measured. To do this, switches 28 and 128 are moved to the testing position to engage points 27 and 127. The same input frequency and voltage at transformer 14 is still used. Slider 126 may now be adjusted so that meter 88 is balanced and shows no current flow. Since resistors 23 and 123 may have different values, and since the transformer secondary 16 will feed resistor 123, it follows that slider 126 must be independently adjusted from slider 26.

Assuming now that slider 126 is properly positioned the testing of transformer 14 may now begin. Input frequency may now be varied. The voltage input may be maintained at a steady value by reference to meter 65. If the input at 10 and 11 is held constant over a frequency range, meter 65 should have a constant reading. The secondary response will have a substantially constant proportion thereof impressed on control grid 131. A substantially constant proportion of impressed primary voltage will be impressed on control grid 31. If the transformer secondary output is constant over a frequency range, meter 88 will not move.

The object of dividing a portion of resistance 155 into decibel steps is to be able to have the characteristics of the transformer to change from dropping to rising without the necessity for reversing meter 88. When the characteristics rise above normal, slider 256 is lowered a definite decibel amount to bring meter 88 on an up scale position. Then the amount of change on 255 in decibel is subtracted from the decibel reading of the meter to get the decibel rise in characteristics of the transformer. This eliminates the necessity of reversing meter 88 or reversing the input terminals when the characteristics change from dropping or rising or vice versa.

Also by having the scale of meter 88 marked in logarithmic ratio and assuming the meter itself is of the usual type having a response directly proportional to the voltage or current, it is clear that the characteristic ratio obtained are in logarithmic ratio. Thus the decibel characteristics of a transformer may be determined in this manner also.

It is also possible to move slider 126 and control the energy in the portion of the system below line 25 so that meter 88 is balanced at all times. Hence the resistance ratios of the settings of slider 126 may be utilized to determine the nature of the transformer output. Naturally if less resistance in 123 is necessary between 122 and 126 it follows that the transformer output is less in comparison to a previous setting. By proper markings on the scales for sliders 26 and 126, the characteristic curve may be plotted. If slider 26 is not moved during the entire test, then the relative values of positions of slider 126 only are significant. On the other hand, it is possible that some unusually high peak or low dip in transformer output may require a relocation of slider 26 in order to keep slider 126 on scale. In that case, a proper proportional factor will result from the ratio of new to old settings of slider 26. However, by making resistance 123 quite large, a long range of variation may be provided. Hence in the initial adjustments, slider 126 may be positioned near the middle of resistance 123 so that substantial variation around that position may be tolerated without change of position of 26. In actual practice, resistances 23 and 123 with their sliders may be any number of decade resistance boxes suitably calibrated either in ohms, decibels or arbitrary numbers in logarithmic or other proportion.

It is also possible to utilize both relative variations of sliders 26 and 126 and readings of meter 88. In such case, the resistance ratio must be multiplied by the meter reading ratio. However, it is simpler to utilize variations in one part of the system and keep the other part constant.

In order to have meter 88 move in one direction only, it is possible to operate one part of the system (with reference to wire 25) at a higher or lower energy level than the other. Thus for example, the output of the part of the system above line 25; i. e. (tubes 32 and 58) may be operated at a level, with reference to the rest of the tubes, so that meter 88 always has a positive reading, for example. In that case, the output of tube 158 will merely tend to decrease or increase the reading about the positive reading. In short, it merely makes a positive reading of meter 88 an artificial zero for meter 88 about which the meter can operate. In that case, an ordinary voltmeter may be used.

It is understood that the various resistors are non-inductive and that care be exercised in avoiding distortion in the amplifiers. The mere fact that tubes 32 and 132 are alike and balanced for example is not enough. Care must be taken so that in the range of operation of the tubes what might be termed the theory of functions should be preserved. Thus if a mere arithmetical difference between opposing tube voltages is to be measured, then the tubes should be operated only over the straight part of its characteristic curve. On the other hand, by operating on curved characteristics of tubes, non-arithmetical differences may be relied upon. Thus if a tube characteristic may be expressed by a simple exponential function it is clear that a pair of opposed tubes operating with such characteristics would immediately give voltage differences at meter 88 having logarithmic relations.

It is thus clear that in its simplest form the invention provides one or more opposed amplifiers through which an input and output may be fed. Resistance coupling is a simple means for obtaining satisfactory operation over a range of frequencies as well as insuring that each amplifier stage operates within prescribed conditions of voltage for fidelity. Apart from pick up resistors 23 and 123, it follows therefore that everything is symmetrical with respect to ground wire 25. In other words, resistors 48 and 148 are equal, resistors 55 and 155 are also equal as are condensers 50 and 150. Preferably the plate circuits of tubes 58 and 158 are symmetrical with respect to terminal 67.

In one respect, the invention provides a pair of opposed amplifiers whose anode circuits are connected in apparent push-pull relation. However the amplifier inputs are more or less independent with the magnitude of applied potentials functionally related to each other in accordance with the characteristics of a transformer or other device under test. The input voltages to both amplifiers are also in phase in the sense that both attain their peak values simultaneously rather than 180° apart as in a true push-pull amplifier. The number of stages of amplification for handling each applied voltage may be varied to suit requirements. Obviously, the frequency range may also vary. Thus radio or intermediate frequency devices may also be tested by generally similar methods.

What is claimed is:

1. A system for comparing the relative voltages over a frequency band of the input and output of a device like a transformer, amplifier or the like, said system comprising a pair of vacuum tube amplifiers with each amplifier having a cathode, control grid and anode circuits respectively, means for applying independently predetermined portions of the input and output voltages to the control grids respectively, means in the amplifier handling the input of the tested device for indicating the energy level of the system, means for combining predetermined portions of the amplified voltages in opposed relation to each other, means for indicating the differential in said opposed voltages, and switching means for cutting out the output voltage to the control grid of said amplifier and substituting therefore the same voltage as applied to the amplifier from the input whereby initial stabilization of the system may be obtained, and variations of input voltage over a frequency band may be compensated for.

2. In a system of the character described, a pair of vacuum tube amplifiers having cathode grid and anode circuits respectively, a meter in the anode circuit of one amplifier, a balancing resistor in the anode circuit of the other amplifier, means for connecting the anode circuits in push-pull relation, means for applying potentials to the control grid having a definite relation to each other determined by attenuation characteristics of a converting device, and a potentiometer bridged between two points in the anode circuits for taking off predetermined portions of the amplified potentials and combining them in opposed relation.

GLENN KOEHLER.